(12) United States Patent
Parmanen et al.

(10) Patent No.: US 6,814,271 B1
(45) Date of Patent: Nov. 9, 2004

(54) TRANSMISSION APPARATUS

(75) Inventors: Olavi Parmanen, Tuusula (FI); Markku Heikkinen, Helsinki (FI); Jyrki Pennala, Vantaa (FI)

(73) Assignee: Nextrom Holdings S.A., Ecublens-Lausanne (CH)

( * ) Notice: Subject to any disclaimer, the term of this patent is extended or adjusted under 35 U.S.C. 154(b) by 0 days.

(21) Appl. No.: 09/555,417
(22) PCT Filed: Dec. 23, 1998
(86) PCT No.: PCT/FI98/01021
§ 371 (c)(1), (2), (4) Date: Jun. 6, 2000
(87) PCT Pub. No.: WO99/35416
PCT Pub. Date: Jul. 15, 1999

(30) Foreign Application Priority Data

Dec. 30, 1997 (FI) .................................. 974644

(51) Int. Cl.$^7$ ............................................. B65H 20/00
(52) U.S. Cl. ..................... 226/188; 226/118.1; 74/409
(58) Field of Search ............................. 226/118.1, 188; 74/409

(56) References Cited

U.S. PATENT DOCUMENTS 3,879,242 A * 4/1975 Mullender et al. .......... 156/137
4,157,886 A * 6/1979 Alfio ........................... 425/438
4,953,417 A   9/1990 Baumgarten et al.

FOREIGN PATENT DOCUMENTS

| DE | 1952545 | 4/1971 |
| EP | 0347475 | 12/1989 |

* cited by examiner

Primary Examiner—Kathy Matecki
Assistant Examiner—Evan Langdon
(74) Attorney, Agent, or Firm—Oliff & Berridge, PLC

(57) ABSTRACT

The invention relates to a transmission apparatus in connection with a pulling equipment intended for moving especially a cable or a corresponding product, the transmission apparatus comprising a shaft that is operated by a motor (11) and that is connected to an output shaft (16) of the transmission apparatus by means of cog wheels (14). The output shaft (16) is connected to means (10) that are in contact with the cable. The cog wheels (14) are arranged to form a circle extending from the motor-driven shaft to the output shaft (16) and correspondingly from the output shaft (16) to the motor-driven shaft. In order to provide clearance-free operation, the cog wheels (14) are helical gearwheels, and one cog wheel shaft is arranged to be moved in its longitudinal direction when the rotation of the output shaft (16) is being decelerated.

6 Claims, 4 Drawing Sheets

TRANSMISSION APPARATUS

Figure 1:
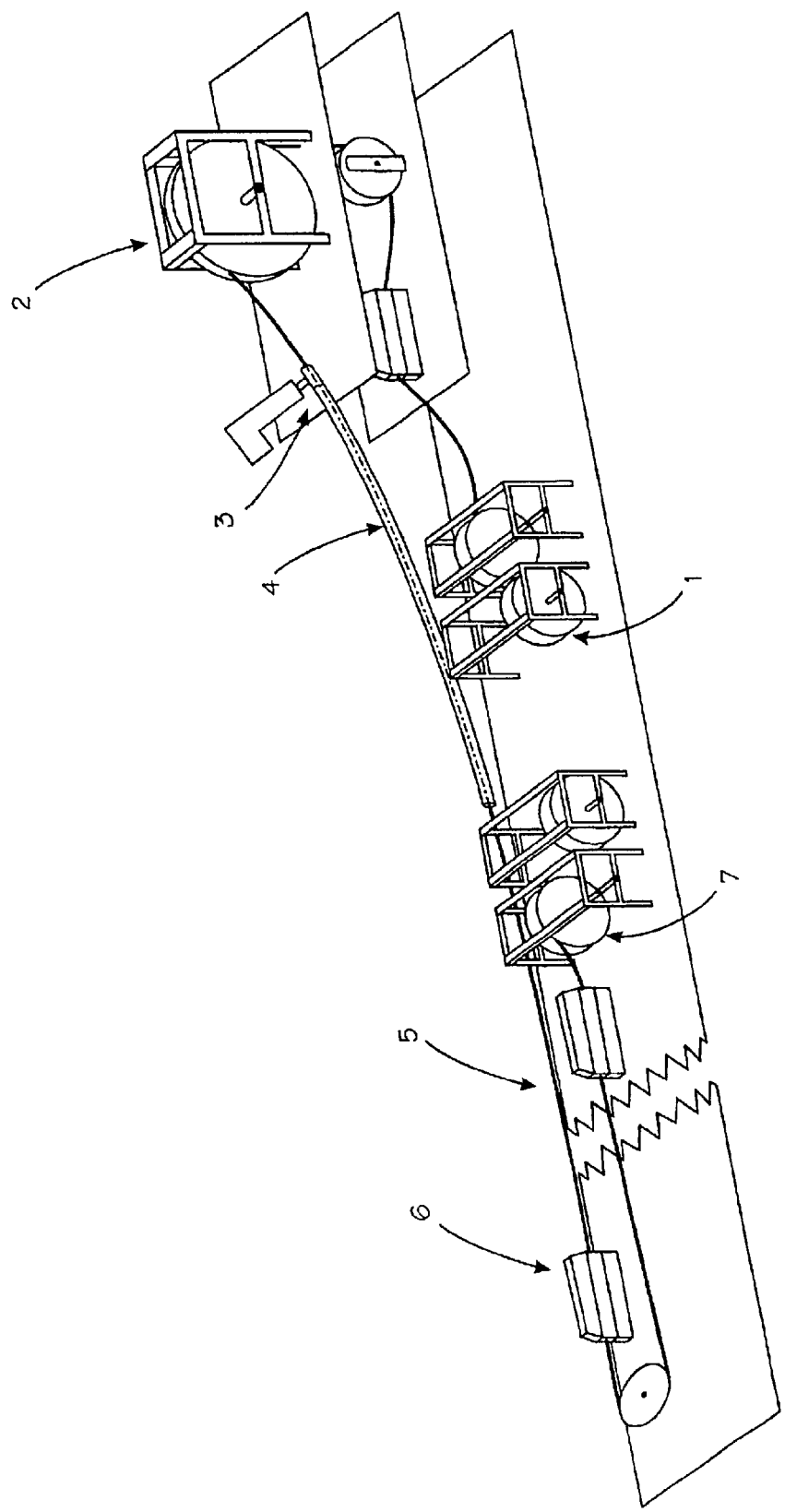

The invention relates to a transmission apparatus in connection with a pulling equipment intended for moving especially a cable or a corresponding product, the transmission apparatus comprising a shaft that is operated by a motor and that is connected to an output shaft of the transmission apparatus by means of cog wheels, said output shaft being connected to means that are in contact with the cable or a corresponding product and that move the cable, the motor being arranged to rotate the output shaft via the driven shaft and the cog wheels in the direction of motion of the cable or the like and, if necessary, to decelerate the rotation of the output shaft in the direction of motion of the cable or the like, the cog wheels being arranged to form a circle extending from the motor-driven shaft to the output shaft and correspondingly from the output shaft to the motor-driven shaft.

In addition to cables, the phrase "a cable or a corresponding product" refers in the present application to ropes, conductors and other products formed from strands, and to semi-finished articles of the products at different stages of production.

When sheathed cables are produced, the sheath must be vulcanized and cooled after the forming stage. For this purpose, the processing line is provided with a vulcanizing tube that is followed by a cooling pipe in the direction of travel of the cable. A metal conductor to be coated is passed through the vulcanizing tube and the cooling pipe by means of a first pulling equipment placed before the extruder and a second pulling equipment located after the cooling pipe. During the vulcanization, the cable is supported in the horizontal extruder process entirely by the aforementioned pulling equipments or by the first pulling equipment, the cooling pipe and the second pulling equipment. The cable travels along a catenary trajectory at least in the vulcanizing tube, which means that at least the vulcanizing tube must be catenary in shape.

During the vulcanization process, the cable must not get into contact with the hot vulcanizing tube, and therefore it is necessary that the cable is kept straight so that it does not touch the inner surface of the vulcanizing tube. If the cable touches the surface of the vulcanizing tube, the cable sheath will be damaged and the cable cannot be used for the intended purpose. The aforementioned matters set great requirements for the operation of the pulling equipments. A pulling equipment, for example a drive wheel, must grip the metal conductor without any slipping between the conductor and the drive wheel, the frame of the pulling equipment must be very sturdy and firmly attached to the bearing surface, the drive wheel must be firmly mounted in bearings to the frame in order to minimize the risk of vibration and oscillation, and for the same reason the transmission of the pulling equipment must operate as smoothly as possible without clearances. The clearance-free operation of the transmission of the pulling equipment is highly significant especially when loading takes place mainly in the direction of motion, as for example in the cable vulcanization process, where the motor may get into decelerating action in connection with certain cable sizes due to the tensile force of the cable. In other words, the motor may change its pole, whereupon the clearance of the gear transmission produces a tug, which easily results in harmful oscillation of the cable.

In prior art pulling equipments, rotation of the drive wheel is based on a transmission apparatus that is formed of a gear rim and a cog wheel and that is placed between an actuator and the drive wheel. In such arrangements, the drive wheel is provided with a gear rim that is coaxial with the axis of rotation of the drive wheel and that comprises either inside or outside gearing, and the pulling equipment is provided with a motor-driven cog wheel. The speed of the motor is controlled by means of a sensor placed in the vulcanizing tube and used to measure the location of the sheathed cable in the tube. The pulling equipment provided at the output end of the cooling pipe is usually run at a constant speed, and the location of the cable in the vulcanizing tube is adjusted by means of control of the rotational speed of the pulling equipment located before the extruder.

In practice, it has been noted, however, that despite very accurate machining of the gear teeth, vibrations occur in the pulling equipment in connection with the gear transmission described above, and the vibrations result in harmful oscillation of the cable in the vulcanizing tube. This is obviously a result of too big clearances between the teeth, the clearances becoming more evident with heavy loads. It should be noted that in the present cable vulcanization lines the distance between the pulling equipments may be as much as 200 meters, which means that a hanging cable causes considerable loading in the drive wheel and the teeth. A possible elliptical shape of the gear rim also causes variation in the clearances of the teeth and therefore in the steadiness of the pulling.

In another prior art arrangement, the drive wheel is replaced with several closely positioned rollers that are mounted in bearings in a substantially semicircular formation, and an inner endless rubber belt travels over the rollers. Outside the curved roller conveyor there is an outer endless rubber belt that passes over a sheave and presses against the roller conveyor in a semicircular form. The metal conductor to be coated travels between the inner and the outer belt to extruders. The speed of the metal conductor in the extruder is adjusted by decelerating the speed of the sheaves around which the inner belt travels. With this arrangement it is possible to avoid the drawbacks resulting from the clearances of the gear transmission, but on the other hand, the decelerating effect provided by means of the drive wheel is simultaneously lost.

Another essential drawback is that the inner rubber belt is subjected to a great pressure that is produced by the rollers and the outer rubber belt and that tends to lead to a breakdown of the inner rubber belt. Another drawback is that the outer rubber belt tends to slide away from the drive groove and therefore breaks.

Another example of prior art arrangements is a caterpillar-type pulling mechanism, which is arranged in connection with a drive wheel that is firmly mounted in bearings in the frame structure, the pulling mechanism being used to forward the metal conductor. On the one hand, such an arrangement improves for example the decelerating effect, but on the other hand, this kind of separate caterpillar equipment comprises clearances, which cause problems with vibration as described above.

An example of prior art arrangements is a pulling equipment where the force is conducted to the central shaft of the drive wheel by means of a worm gear. Such a gear is loaded with a high torque and therefore the equipment must be provided with a rather heavy construction, which also means that it has often rather great clearances that also cause the aforementioned problems with vibration.

The purpose of the present invention is to provide a transmission apparatus with which the prior art drawbacks, such as the vibration problems caused by the clearances of the transmission, can be eliminated. This is achieved with a transmission apparatus according to the invention, which is characterized in that the cog wheels are helical gearwheels and that one cog wheel shaft is arranged to be moved in its longitudinal direction when the rotation of the output shaft is being decelerated, whereupon during the movement of the cog wheel shaft, the cog wheels situated on the shaft are arranged to rotate, due to opposite helicity of the teeth of the cog wheels, the adjacent cog wheels that are in mesh with the first cog wheels, thus eliminating the free play occurring between the cog wheels during the deceleration.

The primary advantage of the invention is that the invention provides even transmission that does not cause harmful vibrations in the cable or a corresponding product. Another advantage of the invention is its simplicity, wherefore the start-up and use of the invention will be advantageous.

Figure 2:
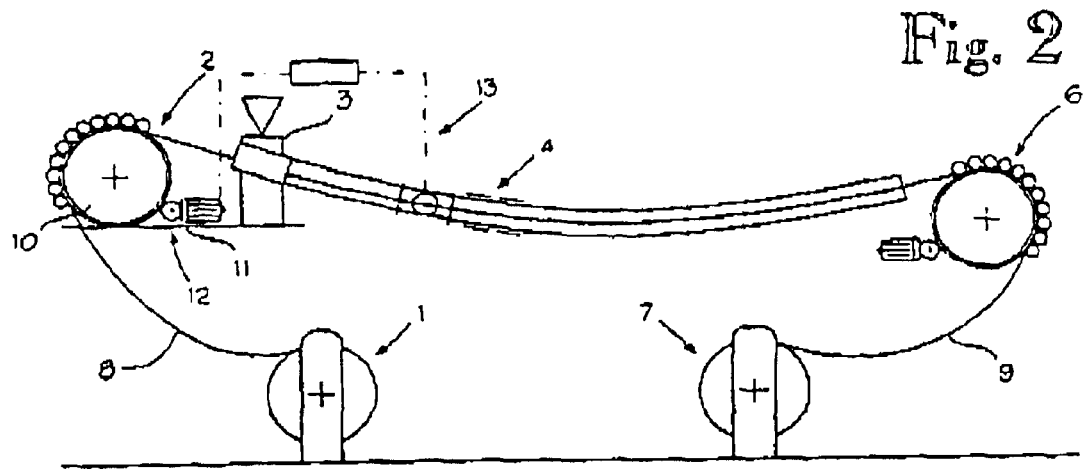
Figure 3:
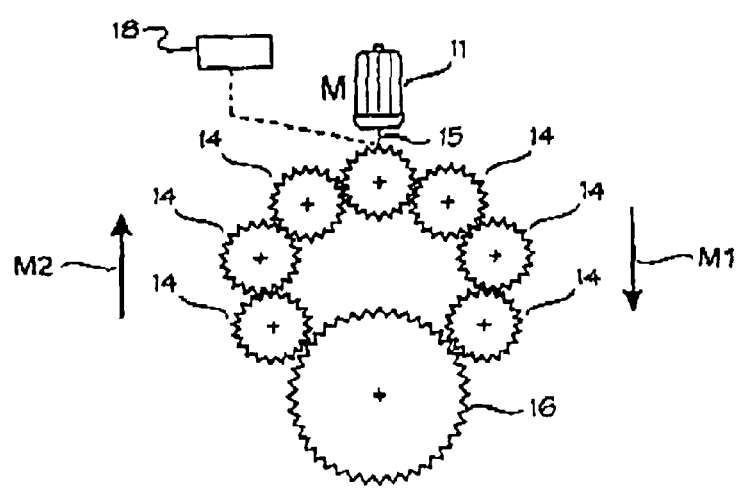
Figure 4:
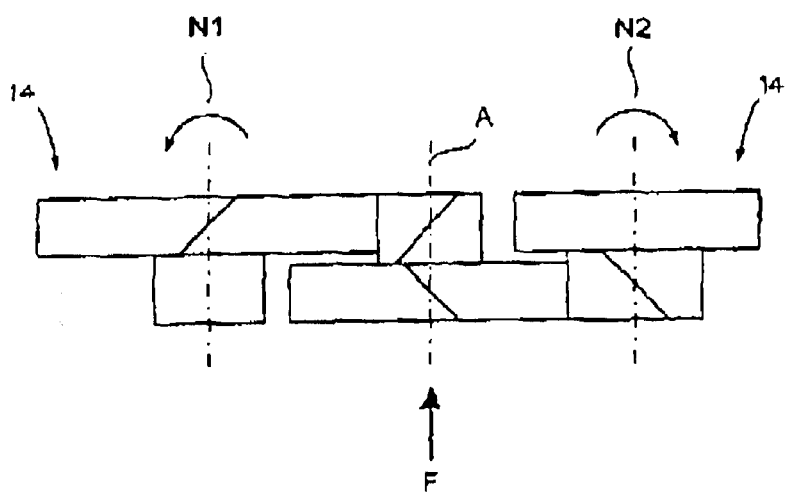
Figure 5:
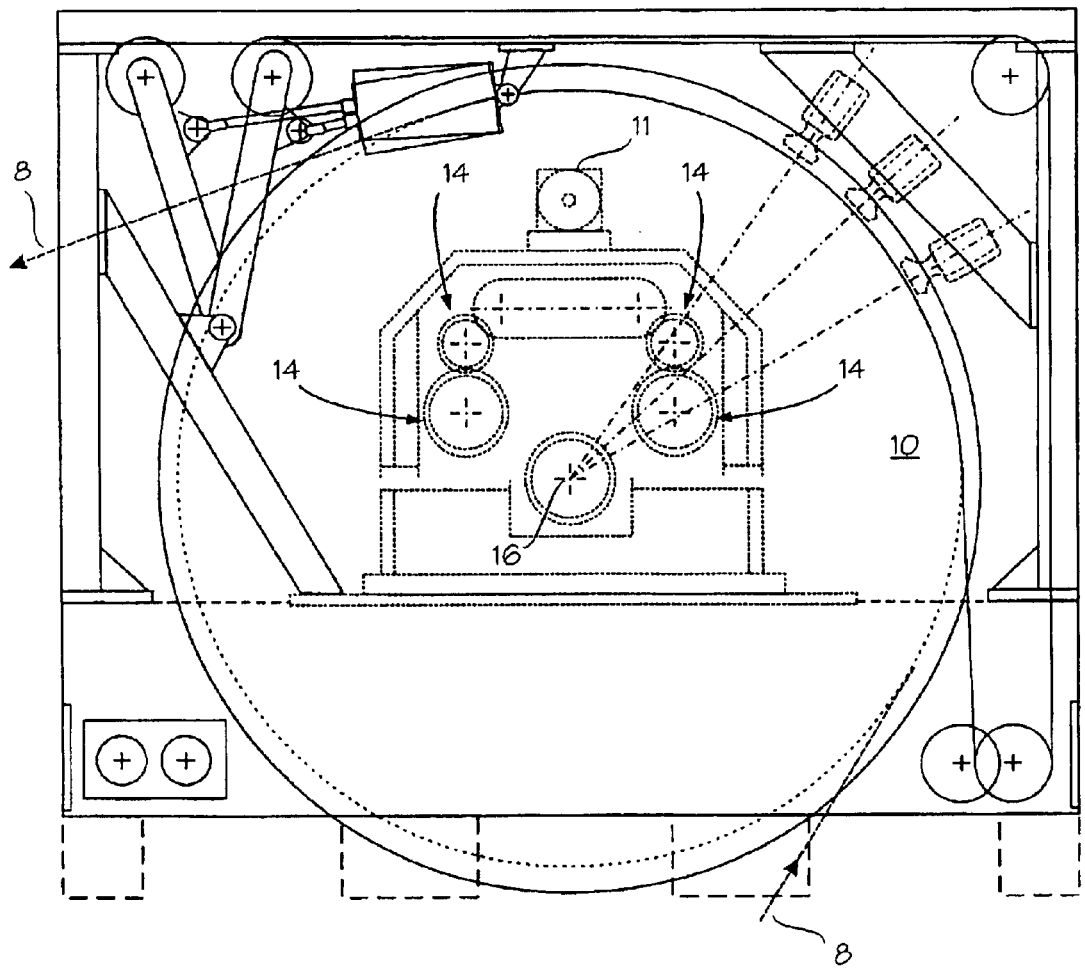
Figure 6:
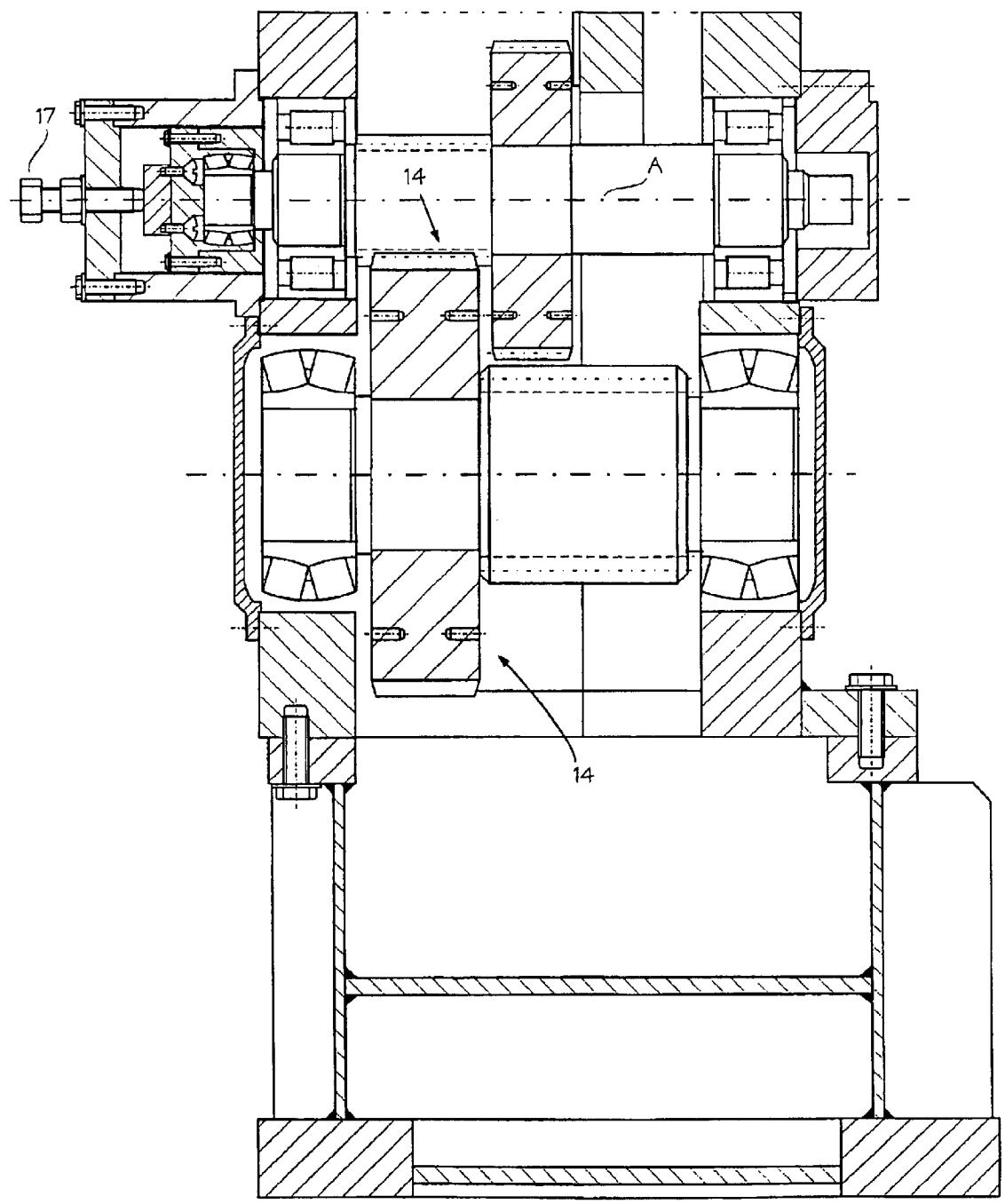

The invention will be described in greater detail below by means of an embodiment shown in the accompanying drawing, in which FIG. 1 is a perspective view of a cable coating line, FIG. 2 is a general view of a pulling arrangement for a cable used in the cable coating line, FIG. 3 is a general view of a transmission apparatus according to the invention, FIG. 4 is a general view of the transmission apparatus of FIG. 3 seen from another direction, FIG. 5 is a side view of an embodiment of the transmission apparatus according to the invention, and FIG. 6 shows a detail of the embodiment of FIG. 5 seen from another direction.

FIG. 1 shows a cable coating line. Reference numeral 1 denotes generally conductor outputs, such as reels, from which the conductors are uncoiled and guided to the coating process. Reference numeral 2 denotes a pulling equipment, which may be a constant-speed capstan, for example. Reference numeral 3 denotes an extrusion head with which a plastic sheath is formed on the structure consisting of the conductors. Reference numeral 4 denotes in FIG. 1 a vulcanizing tube and reference numeral 5 denotes a cooling section. Reference numeral 6 in turn denotes a pulling equipment with which the cable is pulled onto a take-up reel, which is denoted generally by reference numeral 7. The structure, details and operation of the cable vulcanization line of FIG. 1 are fully known to a person skilled in the art and therefore they will not be described in greater detail in this connection.

FIG. 2 is a general view of a pulling arrangement in a cable vulcanization line. Like reference numerals are used in FIGS. 1 and 2 to denote like parts. Further, in FIG. 2 reference numeral 8 denotes conductors that are uncoiled from an output reel 1 and reference numeral 9 correspondingly denotes a cable, consisting of the conductors and a sheath, that is guided to the take-up reel 7. In the embodiment of FIG. 2, the pulling equipment 2 comprises a drive wheel 10, a motor 11 and a transmission apparatus consisting of gear transmission 12. The pulling equipment 2 also comprises control means 13 with which the speed of the cable in the vulcanizing tube 4 is kept constant so that the sheath surrounding the conductors does not get in contact with the inner surface of the vulcanizing tube. The cable travels inside the vulcanizing tube along a catenary trajectory.

The problems of the prior art arrangements are related specifically to the above-described pulling equipment since the transmission apparatus produces vibrations in the cable, as stated above. The problem is most apparent in the pulling equipment 2 of the vulcanization line, where loads act mainly in the direction of motion of the cable. The vibrations result from the clearances of the transmission apparatus. The vibrations make the cable oscillate in the vulcanizing tube, whereupon the cable is likely to touch the inner surface of the vulcanizing tube, and the sheath will be damaged. The purpose of the transmission apparatus according to the invention is to provide an arrangement which enables eliminating problems that result from clearances of the cog wheels of the transmission apparatus, for example the above-described problems occurring in connection with the pulling equipment in the cable vulcanization line.

FIGS. 3 and 4 illustrate the basic principle of the transmission apparatus according to the invention. According to the basic idea of the invention, transmitting cog wheels 14 are arranged to form a circle that extends from a shaft 15 operated by the motor 11 to an output shaft 16 and correspondingly from the output shaft 16 to the shaft 15 operated by the motor 11. Further, the cog wheels 14 are helical gearwheels, and one cog wheel shaft A is arranged to be moved in its longitudinal direction. As the shaft is moved, the cog wheels situated on the shaft are arranged to rotate, due to the opposite helicity of the teeth of the cog wheels, the adjacent cog wheels 14 that are in mesh with the first cog wheels. This eliminates the free play between the cog wheels.

The movement of one cog wheel shaft A in its longitudinal direction is shown generally in FIG. 4. The shaft A is transferred by means of a force F that is parallel to the axis of rotation of the cog wheels situated on the shaft. The helicity of the teeth of the cog wheels is shown in FIG. 4 by means of diagonal lines drafted in the cog wheels. Moving the cog wheel shaft A by means of the force F makes the adjacent cog wheels which are in mesh with the cog wheels situated on the shaft A rotate around their axes of rotation. This rotational movement is denoted by means of arrows N1 and N2. It is clear that the rotational movement according to arrows N1 and N2 also rotates correspondingly the next cog wheels that are in mesh with the aforementioned cog wheels, and so on, the disadvantageous clearances being thus eliminated from the entire transmission chain. It is clear that the cog wheel 14 that is moved can be any one of the cog wheels 14.

Referring again to FIG. 4, N1 and N2 may also be described as reactive forces in that, when the force F is applied in a longitudinal direction at shaft A, resultant reactive forces N1 and N2 will be applied at adjacent cog wheels. Because only shaft A is moved longitudinally be the force F, in this embodiment, free play between the teeth of the cog wheels is eliminated.

The above-described circle formed by the cog wheels 14 transmits the rotating motion of the motor as shown by arrow M1 in FIG. 1, whereas opposite motion is transmitted as shown by arrow M2.

The force F that moves one cog wheel shaft A in the longitudinal direction can be produced in any suitable manner. One advantageous method is to use a screw means to produce the force F. Such an embodiment is shown in FIGS. 5 and 6. The screw means is denoted in FIG. 6 by reference numeral 17. The trajectory of the conductors 8 is shown in FIG. 5 by means of a broken line. In FIGS. 5 and 6, like reference numerals refer to like parts as in FIGS. 1 to 4.

The transmission apparatus shown in the figures may also comprise different sensor means that can be used to monitor and control the process. Examples of such means include a sensor means 18 which measures the loading tension of the gear or which measures the line tension of a cable or the like. The sensor means 18 may naturally also be provided with means that give an alarm if there are breakdowns in the run.

Even though the invention is described above in connection with a constant-speed pulling equipment of a cable vulcanization line, the invention is not restricted in any way to this embodiment. The invention can also be applied in other arrangements. The transmission apparatus according to the invention can also be used for example as a pulling equipment 6 in a vulcanization line. It should also be noted that the invention is not restricted in any way to be used merely in connection with a pulling equipment utilizing a principle of a drive wheel, but the invention can be applied in connection with different pulling equipments. Examples of different alternatives include various belt pulling equipments or caterpillar-type pulling equipments, and different capstans which have no belt and where the cable revolves 2 to 3 times around the reel. The invention can therefore be applied in connection with any equipment that is used on the line as a pulling equipment. One example concerns spooling processes. Therefore, the invention is not restricted in any way to a vulcanization process, even though the invention does provide particular advantages in connection with such a process.

What is claimed is:

1. A transmission apparatus in connection with a pulling equipment intended for moving a cable or a corresponding product, the transmission apparatus comprising a shaft that is operated by a motor and that is connected to an output shaft of the transmission apparatus by means of cog wheels, said output shaft being connected to means that are in contact with the cable or the corresponding product and that move the cable, the motor being arranged to rotate the output shaft via the driven shaft and the cog wheels in the direction of motion of the cable or the corresponding product and, if necessary, to decelerate the rotation of the output shaft in the direction of motion of the cable or the corresponding product, the cog wheels being arranged to form a circle extending from the motor-driven shaft to the output shaft and correspondingly from the output shaft to the motor-driven shaft, wherein the cog wheels are helical gearwheels and wherein one cog wheel shaft is arranged to be moved in its longitudinal direction when the rotation of the output shaft is being decelerated, whereupon during the movement of the one cog wheel shaft, the cog wheels situated on the shaft are arranged to rotate, due to opposite helicity of the teeth of the cog wheels, the adjacent cog wheels that are in mesh with the first cog wheels, thus eliminating the free play occurring between the cog wheels during the deceleration, wherein a force applied to the one cog wheel shaft in the longitudinal direction of the one cog wheel shaft moves the cog wheel shaft.

2. The transmission apparatus according to claim 1, wherein the transmission apparatus comprises a sensor means for measuring the loading tension of the gear.

3. The transmission apparatus according to claim 1, wherein the transmission apparatus comprises a sensor means for measuring the line tension of the cable or the corresponding product.

4. The transmission apparatus according to claim 1, wherein the transmission apparatus is arranged in connection with the pulling equipment in a cable vulcanization line.

5. The transmission apparatus according to claim 4, wherein the transmission apparatus is arranged in connection with a constant-speed pulling equipment in a cable vulcanization line.

6. The transmission apparatus according to claim 1, wherein a screw means applies the force.

* * * * *